US006578518B1

(12) United States Patent
Conforti

(10) Patent No.: US 6,578,518 B1
(45) Date of Patent: Jun. 17, 2003

(54) BIRD FEEDING

(76) Inventor: Carl J. Conforti, P.O. Box 6315, Fall River, MA (US) 02724

( * ) Notice: Subject to any disclaimer, the term of this patent is extended or adjusted under 35 U.S.C. 154(b) by 0 days.

(21) Appl. No.: 10/177,076

(22) Filed: Jun. 21, 2002

Related U.S. Application Data

(60) Provisional application No. 60/324,444, filed on Sep. 24, 2001.

(51) Int. Cl.[7] .............................................. A01K 61/02
(52) U.S. Cl. ...................... 119/57.8; 119/57.9; 119/52.3
(58) Field of Search ............................... 119/52.2, 52.3, 119/57.8, 57.9

(56) References Cited

U.S. PATENT DOCUMENTS

| | | | | |
|---|---|---|---|---|
| 3,124,103 A | * | 3/1964 | Stainbrook | 119/52.3 |
| 4,541,362 A | * | 9/1985 | Dehls | 119/57.9 |
| 4,846,111 A | * | 7/1989 | Kilham | 119/57.9 |
| 5,921,201 A | * | 7/1999 | Green | 119/52.3 |
| 5,947,054 A | * | 9/1999 | Liethen | 119/57.9 |
| 6,158,385 A | * | 12/2000 | Boyd | 119/52.3 |
| 6,192,832 B1 | * | 2/2001 | Husnik | 119/57.9 |
| 6,415,737 B2 | * | 7/2002 | Banyas et al. | 119/57.9 |

* cited by examiner

*Primary Examiner*—Charles T. Jordan
*Assistant Examiner*—Elizabeth Shaw

(57) ABSTRACT

A bird feeder is configured to hold bird feed and to provide access to the bird feed by birds, the bird feeder including a housing, and a perch coupled to the housing and configured to have at least a landing portion of the perch move from a feeding position toward a feed-inhibiting position, different from the feeding position, relative to the housing, the perch being configured to have the landing portion provide support for a bird eating the bird feed while the perch is in the feeding position, the perch being further configured to be in the feeding position in the absence of an animal's weight being applied to the landing portion of the perch, and to have at least the landing portion move toward the feed-inhibiting position in response to application to the landing portion of at least a weight associated with an adult squirrel, wherein the perch is configured such that the landing portion of the perch will inhibit a squirrel from using the landing portion for support while in the feed-inhibiting position.

26 Claims, 20 Drawing Sheets

BIRD FEEDING

CROSS-REFERENCE TO RELATED ACTIONS

This application claims the benefit of U.S. Provisional Application No. 60/324,444 filed Sep. 24, 2001.

FIELD OF THE INVENTION

The invention relates to bird feeding and more particularly to inhibiting rodents from accessing bird feeders.

BACKGROUND OF THE INVENTION

Many people provide bird feed for birds to come and eat near the people's homes. People often enjoy watching the birds or otherwise enjoy providing food for birds. Often, however, rodents such as squirrels will eat the food intended for the birds. This is typically undesirable, e.g., because the people supplying the food want to attract birds, not rodents, and because the rodents can consume large amounts of the food, causing people to spend more money than desired on bird feed. The rodents can also spill the bird feed, and even harm or destroy the feeder itself.

Many devices exist that are intended to deter, inhibit, or prevent rodents such as squirrels from reaching, eating, or wasting bird feed or reaching or harming bird feeders. These devices can require large amounts of maintenance. Often these devices are designed for a particular feeder, or to feeders mounted in a specific way. Some devices include motors that will spin a rodent that reaches the feeder. These motors typically require batteries that have a limited useful life, requiring recharging or replacement.

SUMMARY OF THE INVENTION

In general, in an aspect, the invention provides a bird feeder configured to hold bird feed and to provide access to the bird feed by birds, the bird feeder including a housing, and a perch coupled to the housing and configured to have at least a landing portion of the perch move from a feeding position toward a feed-inhibiting position, different from the feeding position, relative to the housing, the perch being configured to have the landing portion provide support for a bird eating the bird feed while the perch is in the feeding position, the perch being further configured to be in the feeding position in the absence of an animal's weight being applied to the landing portion of the perch, and to have at least the landing portion move toward the feed-inhibiting position in response to application to the landing portion of at least a weight associated with an adult squirrel, wherein the perch is configured such that landing portion of the perch will inhibit a squirrel from using the landing portion for support while in the feed-inhibiting position.

Implementations of the invention may include one or more of the following features. The landing portion is substantially perpendicular to gravity in the feeding position and is substantially parallel with gravity in the feed-inhibiting position. The landing portion is less than about 45° relative to parallel to gravity in the feed-inhibiting position. The perch is configured to return to the feeding position upon removal of the at least a weight associated with an adult squirrel. The perch is configured such that the feed-inhibiting position of the landing portion of the perch will influence a squirrel to fall off of the feeder. The landing portion is biased toward the feeding position. The feeder further includes a spring coupled to the landing portion of the perch and wherein the landing portion is biased toward the feeding position by the spring. The perch is coupled to the housing such that the landing portion can pivot between the feeding position and the feed-inhibiting position. The perch is coupled to the housing such that the landing portion can slide between the feeding position and the feed-inhibiting position.

Implementations of the invention may also include one or more of the following features. The housing provides an opening configured to allow a bird to access the bird feed held by the feeder and wherein the perch is further configured to inhibit access through the opening when in the feed-inhibiting position. The perch comprises a door, coupled to the landing portion, that is configured to at least partially block the opening when the landing portion is in the feed-inhibiting position. The perch is a first perch and the landing portion is a first landing portion, the feeding position is a first feeding position, and the feed-inhibiting position is a first feed-inhibiting position, the feeder further comprising at least a second perch coupled to the housing and configured to have at least a second landing portion move between a second feeding position and a second feed-inhibiting position relative to the housing. The second perch is configured such that the second landing portion can move between the second feeding position and the second feed-inhibiting position independently of the first landing portion moving between the first feeding position and the first feed-inhibiting position.

Implementations of the invention may also include one or more of the following features. The perch comprises a mounting member adapted to fixedly couple to the housing, a spring, and a landing member having the landing portion and being pivotally coupled to the mounting member, the spring being disposed to bias the landing member away from the mounting member toward the feeding position. The mounting member is configured with teeth and is configured to be wedged into a receptacle provided by the housing. The feeder further includes a sound-producing device coupled to at least one of the housing and the perch and configured to be actuated in response to the landing portion moving toward the feed-inhibiting position. The feeder further includes a top, and wherein the perch is slidably coupled to the housing and is fixedly coupled to a top, the top providing an opening through which birds can access the bird feed, the top being configured such that the opening substantially closes to inhibit access to the bird feed when the perch moves to the feed-inhibiting position. The top defines a plurality of openings, wherein the perch comprises a platform coupled to a corresponding plurality of landing members and the housing defines a corresponding plurality of slots configured to receive the landing members as the landing members move from respective feeding positions toward respective feed-inhibiting positions, and wherein the housing and the top move relative to each other to substantially close the openings when the landing members move from respective feeding positions toward respective feed-inhibiting positions.

In general, in another aspect, the invention provides a bird feeder for providing access to bird feed by birds and inhibiting access to the bird feed by squirrels, the bird feeder including a housing including a base portion and a top portion, the housing being configured to contain bird seed and provide access by birds to the bird seed, and perch means, coupled to the housing, for providing support to a bird to access the bird seed and for moving at least a support portion between a feeding position and a feed-inhibiting position in response to application of at least about the weight of an adult squirrel to the support portion to at least one of inhibit a squirrel from using the support portion for support to access the bird feed while in the feed-inhibiting position and inhibit access through the housing to the bird feed.

Implementations of the invention may include one or more of the following features. The support portion moves from being substantially perpendicular to gravity, with the feeder in use, while in the feeding position toward being parallel to gravity when moving toward the feed-inhibiting position. The support portion of the perch means is spring-biased toward the feeding position. The perch means comprises a retractable cord coupled to the support portion. The perch means comprises a sensor and an electrical release configured to allow the support portion to move in response to the sensor indicating application of the at least about the weight of an adult squirrel to the support portion.

In general, in another aspect, the invention provides a movable perch replacement for use with a bird feeder including a base, the replacement including a mounting member configured to be mounted to the base of the bird feeder, a spring, and a landing member pivotally coupled to the mounting member and biased by the spring away from the mounting member, wherein the spring is configured to support the landing member, while a bird stands on the landing member, in a substantially horizontal position and to allow the landing member to pivot toward a substantially vertical position in response to a weight of at least about that of an adult squirrel being applied to the landing member.

Implementations of the invention may include one or more of the following features. The mounting member is sized and shaped to fit into a receptacle of the base. The mounting member includes at least one barb configured to resist removal from the receptacle.

Various aspects of the invention may provide one or more of the following advantages. Undesired animals may be deterred and/or inhibited from accessing bird feeders. An animal-deterring/inhibiting device can be self contained, employ a simple spring mechanism, and/or be self resetting. An animal-deterring/inhibiting device can adapt, or be adapted, to different bird feeders. A sound-producing device may be employed to deter animals. Access-inhibiting devices may be employed that inhibit access to bird feeders by animals exceeding a certain weight.

These and other advantages of the invention, along with the invention itself, will be more fully understood after a review of the following figures, detailed description, and claims.

DETAILED DESCRIPTION OF PREFERRED EMBODIMENTS

At least some embodiments of the invention provide various techniques for feeding birds while inhibiting undesired animals such as rodents, and in particular squirrels, from accessing bird feeders. Implementations of the invention may be in the form of bird feeders, or devices that can be combined with or incorporated in bird feeders.

Figure 1:
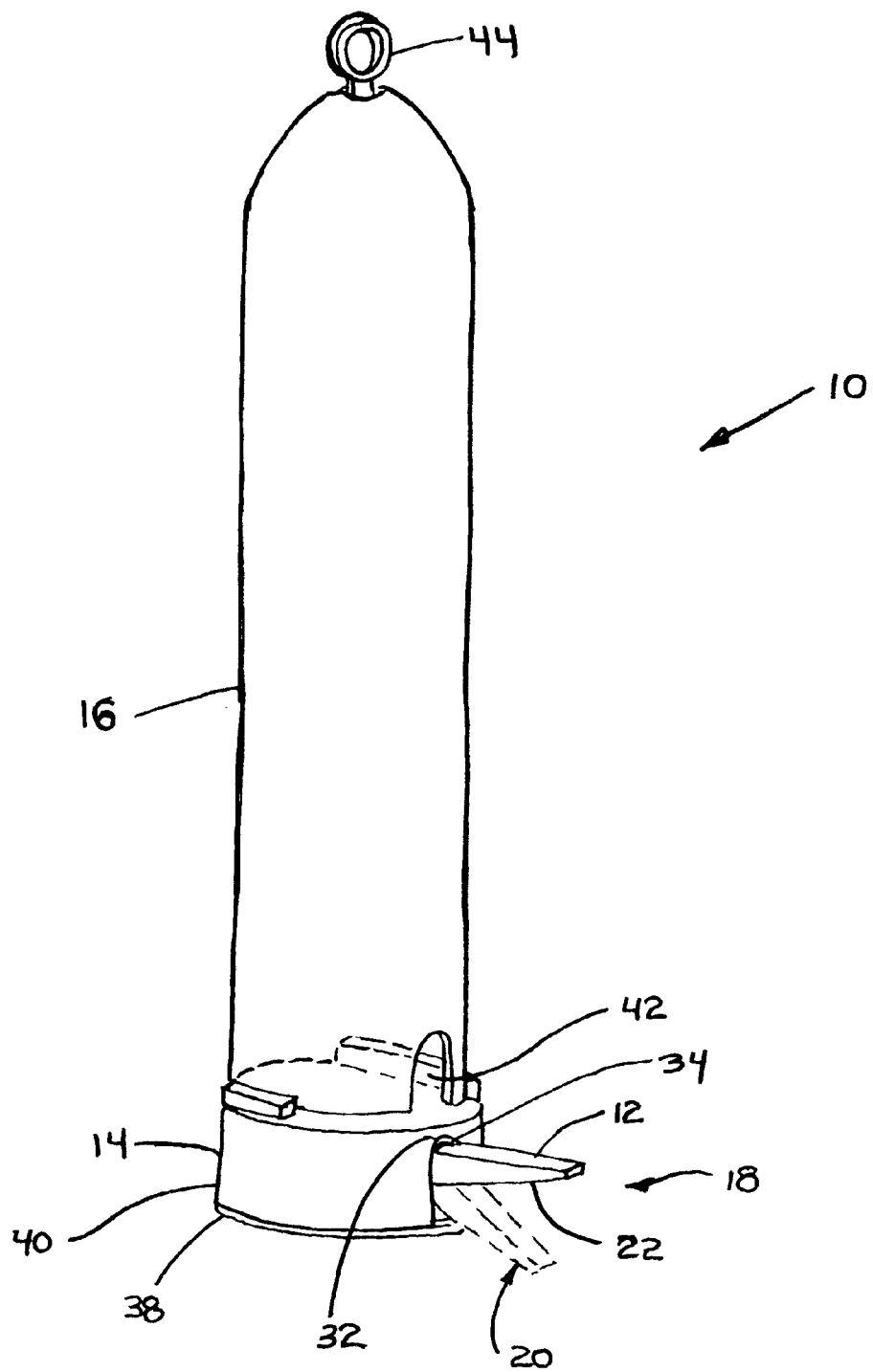
FIG. 1 is a simplified perspective view of a bird feeder with releasable perch.

Referring to FIG. 1, a bird feeder 10 includes a releasable perch 12, a base 14, and a top 16. The perch 12 can release to a position (e.g., less than horizontal, i.e., approximately 90 degrees relative to gravitational pull g, e.g., to approximately parallel to gravity) in response to a predetermined weight (or greater) being placed on the perch 12, or a predetermined moment arm at a pivot point of the perch 12 being exceeded.

Preferably, the perch 12 can support the weight of a bird desired to be allowed to use the feeder 10 without the perch 12 releasing or at least significantly moving such that desired birds are deterred/inhibited from feeding.

The perch 12 is movably, here pivotally, coupled to the base 14 and biased to a feeding position 18 as shown in solid lines in FIG. 1. The perch 12 can pivot to a deterrent/inhibiting position 20 (e.g., approximately parallel to gravity, or less than 45° from parallel to gravity) shown in dashed lines in FIG. 1. As shown, with further reference to FIG. 2, the perch 12 includes a landing member 22, a mounting member 24, and a spring 26. The lander 22 is pivotally coupled to the mount 24 with a pin 28. The landing member 22 is shaped to extend away from the base 14 and provide a perch for birds to land on and to stand on while feeding using the feeder 10. The spring 26 is a bent wire wrapped around the pin 28 and disposed between a bulge 30 of the pin 28 and the mounting member 24. The spring 26 biases the lander 22 into the resting position 18 as shown at approximately a right angle (although the particular angle employed can be varied, e.g., see the example below with a resting angle of approximately 180 degrees). The spring 26 pushes the landing member 22 against a wall 32 of the base 14 providing an opening 34 for the landing member 22. Alternatively, the spring 26 may support the landing member 22 in the resting position 18 without biasing the landing member 22 against the wall 32. The landing member 22 is disposed partially within the base 14.

The spring 26 is configured to provide sufficient support for the landing member 22 and a bird, and insufficient support for the landing member 22 and an adult squirrel. The spring 26 is configured such that its spring constant will be overcome by the weight of a typical adult squirrel when applied to the landing member 22. The landing member 22 is preferably disposed partially within the base 14 such that the squirrel's weight, when applied to any exposed portion of the landing member 22, will be disposed far enough along the landing member's length away from where the landing member 22 is coupled to the base 14 to produce a moment arm sufficient to overcome the spring's bias and move the landing member 22 from the feeding position 18 toward, if not to, the deterrent/inhibiting position 20.

Components of the perch 12 can be made of various materials. The landing and mounting members 22, 24, as well as the spring 26, may be, e.g., metal or plastic. The spring 26 could be any other appropriate material capable of providing the spring characteristics desired. Also, the landing member 22 and the mounting member 24 could be, e.g., wood, or ceramic, or numerous other materials. Preferably, the spring 26, the landing member 22, and the mounting member 24 are weather-resistant materials.

The perch 12 can be assembled as part of the feeder 10 as follows. The spring 26, having an approximately 450° turn is provided and placed over the pin 28, with the pin 28 being inserted through an opening in the spring's turn. The pin 28 is inserted into holes in the mounting member 24 and the landing member 22 that allow the landing member 22 to rotate about the pin 28. The pin 28 is inserted into co-axial openings in the base 24. The mounting member 24 is positioned and mounted to the base 24, e.g., to a block 36 of a bottom 38 of the base to immobilize the mounting member 24 relative to the base 14. The bottom 38 is connected to a top 40 of the base 14, and the top 16 is connected to the base 14.

Figure 2:
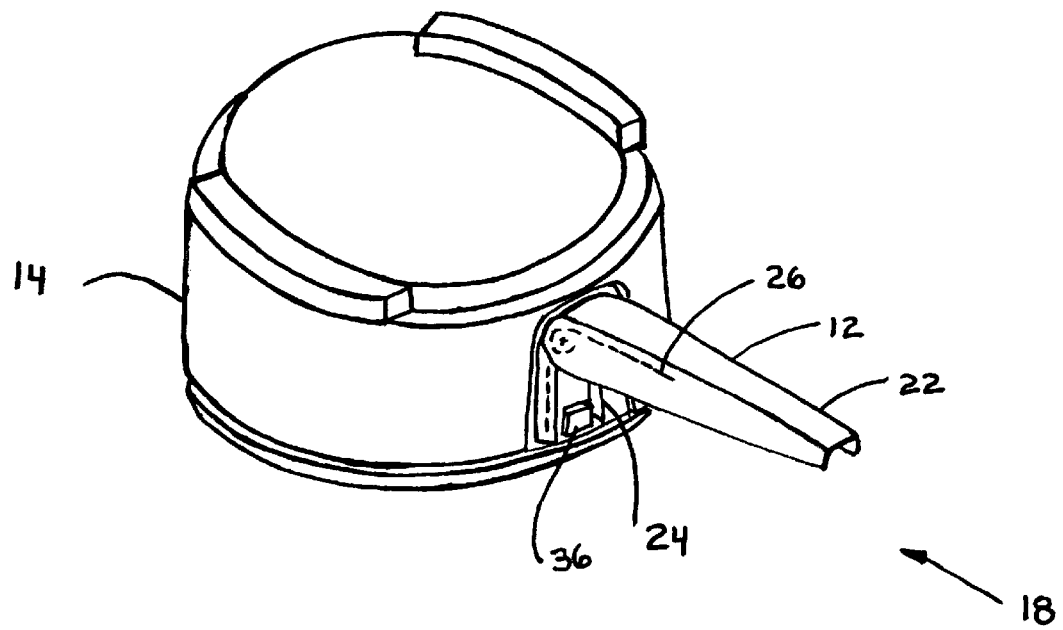
FIG. 2 is a partially cut away view of a base of the bird feeder shown in FIG. 1.
Figure 3:
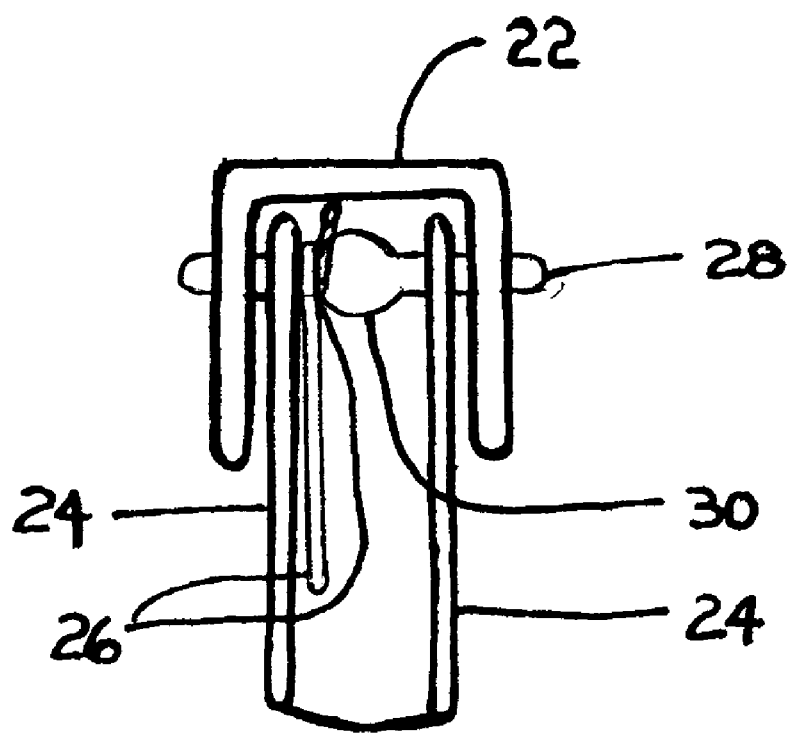
FIG. 3 is an end view of the perch shown in FIG. 1.
Figure 4:
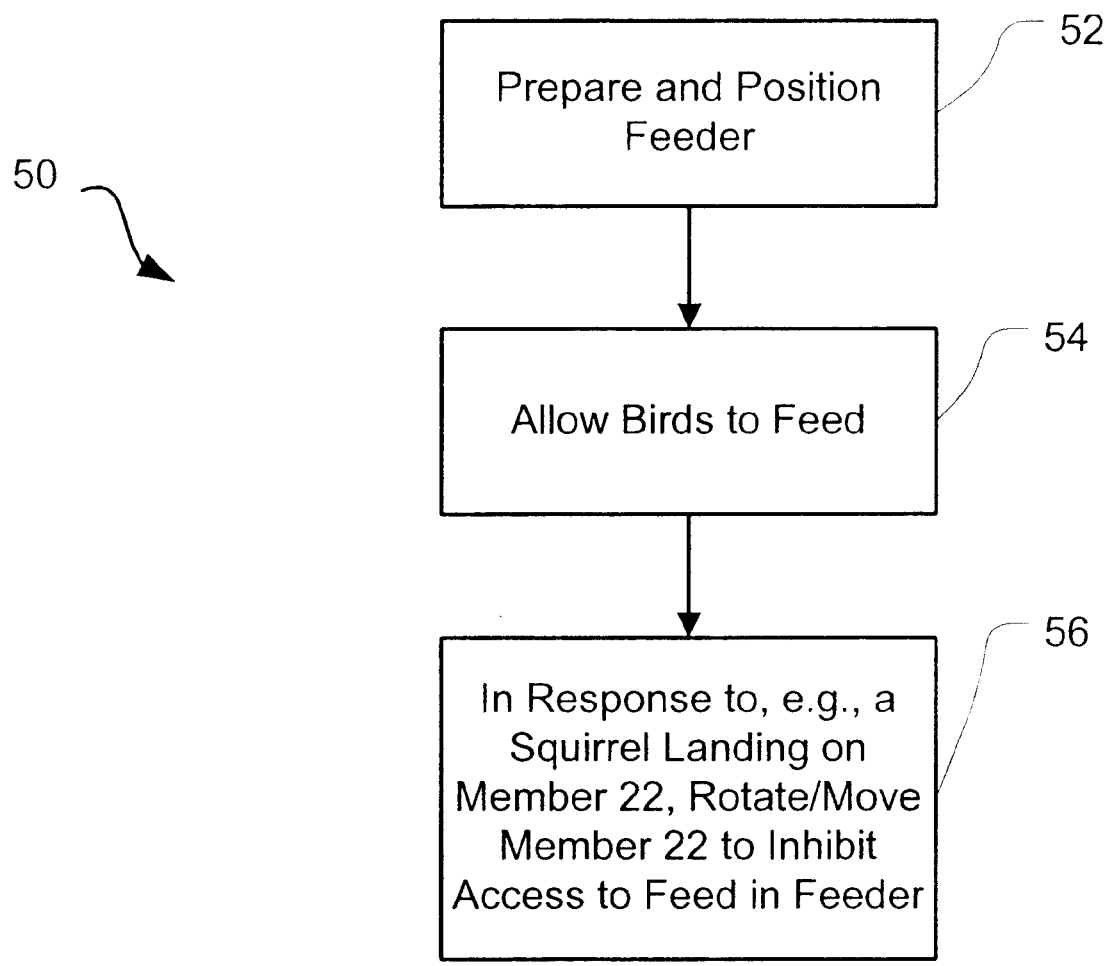
FIG. 4 is a block flow diagram of a process of using the feeder shown in FIG. 1.

In operation, referring to FIG. 4, with further reference to FIGS. 1–3, a process 50 for feeding birds while inhibiting/deterring squirrels from accessing bird feed using the feeder 10 includes the stages shown. The process 50, however, is exemplary only and not limiting. The process 50 can be altered, e.g., by having stages added, removed, or rearranged.

At stage 52, the feeder 10 is prepared and positioned for feeding. The feeder 10 is filled with bird feed by removing a hook 44 in the top 16, pouring bird feed into the top 16, and replacing the hook. The feeder is placed outside, e.g., hung from a tree branch using the hook.

At stage 54, birds are allowed to stand on the perch 12 and feed using the feeder 10. A bird can land on the landing member 22 with the perch 12 in the feeding position 18. While standing on the member 22, the bird can extend its beak through an opening 42 in the top 16 and eat the feed inside the top 16. The spring 26 will support the weight of the landing member 22 and the bird.

At stage 56, squirrels or other animals heavier than that supportable by the perch 12 are inhibited/deterred from accessing and eating the feed in the feeder 10. For example, a squirrel lands on the landing member 22. In response, the landing member 22 pivots about the pin 28 toward the deterrent/inhibiting position 20. As the landing member 22 pivots, it becomes difficult for the squirrel to stay on the landing member 22 and the squirrel falls off of the feeder 10. When the squirrel or other animal's weight is removed, the perch 12 returns to the feeding position 18.

Figure 6:
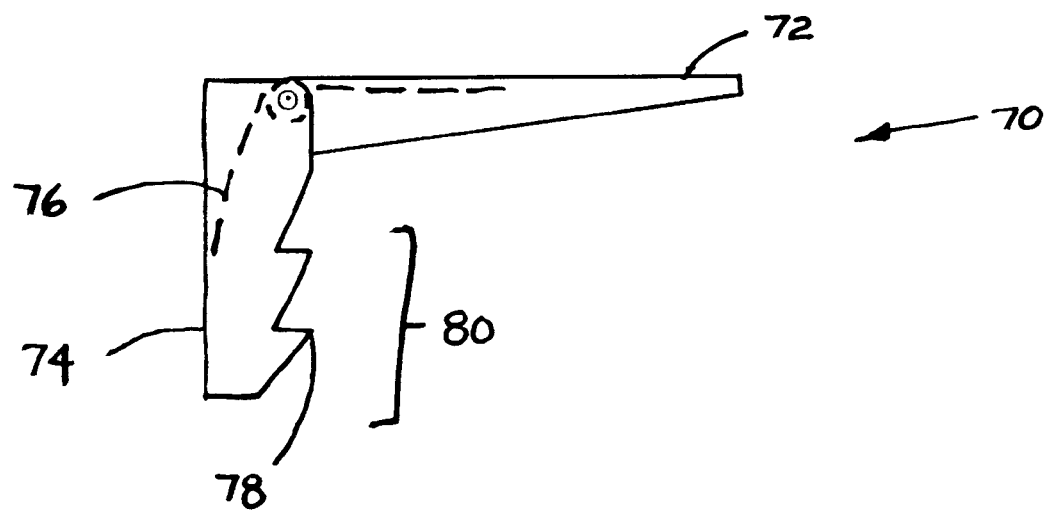
FIG. 6 is a side view of a stake/wedge configuration of a perch.
Figure 18:
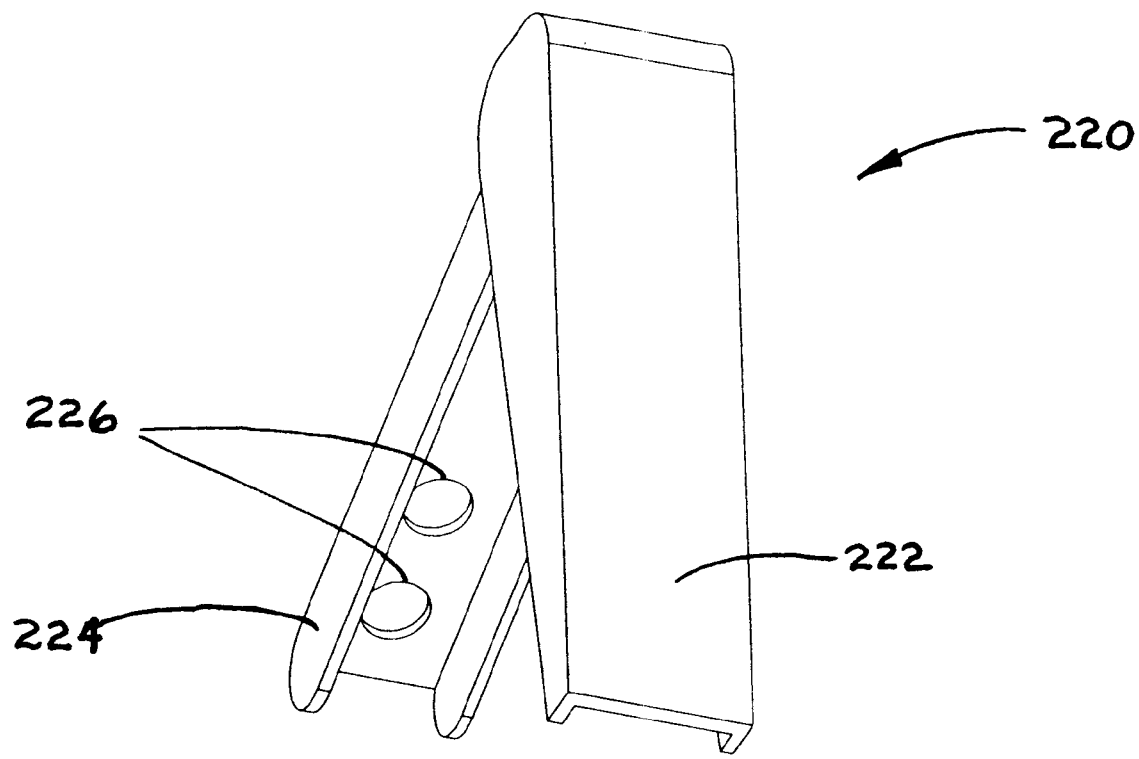
FIG. 18 is a simplified perspective view of a retrofit movable perch.

Other embodiments are within the scope and spirit of the appended claims. For example, more than one perch may be provided on a feeder. The multiple perches may operate independently (e.g., moving toward the inhibiting position only if individually actuated to do so) or in conjunction with each other (e.g., all moving to the deterrent/inhibiting position in unison, e.g., if a squirrel lands on any of them). Additionally, the perch 12 may be attached to bases of feeders originally configured with fixed perches. For example, a fixed perch of a feeder may be removed, and the perch 12 attached to the feeder with the landing member 22 where the previous, fixed perch was. This may also be done for other forms of the movable perch described below, as well as other configurations of movable perches. Referring to FIG. 18, a releasable perch 220 is configured similar to the perch 70 shown in FIG. 6. A mounting member 224 of the perch 220, however, is configured to retrofit to a bird feeder (not shown). Here, the mounting member 224 has two screw holes 226 for mounting the mounting member 224 to the base of a bird feeder. The perch includes a landing member 222 and a spring (not shown) for biasing the landing member 222 for supporting birds while feeding using the feeder. Other means may be used, and the mounting member 224 configured for use with other means, to mount the perch 220 to a bird feeder.

Figure 5:
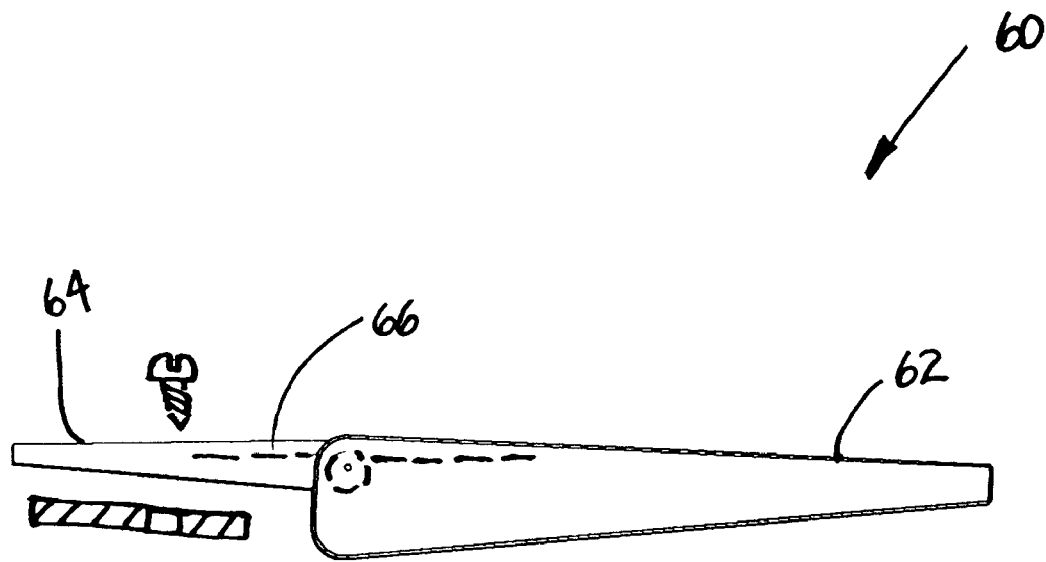
FIG. 5 is a side view of another releasable perch configuration.
Figure 7:
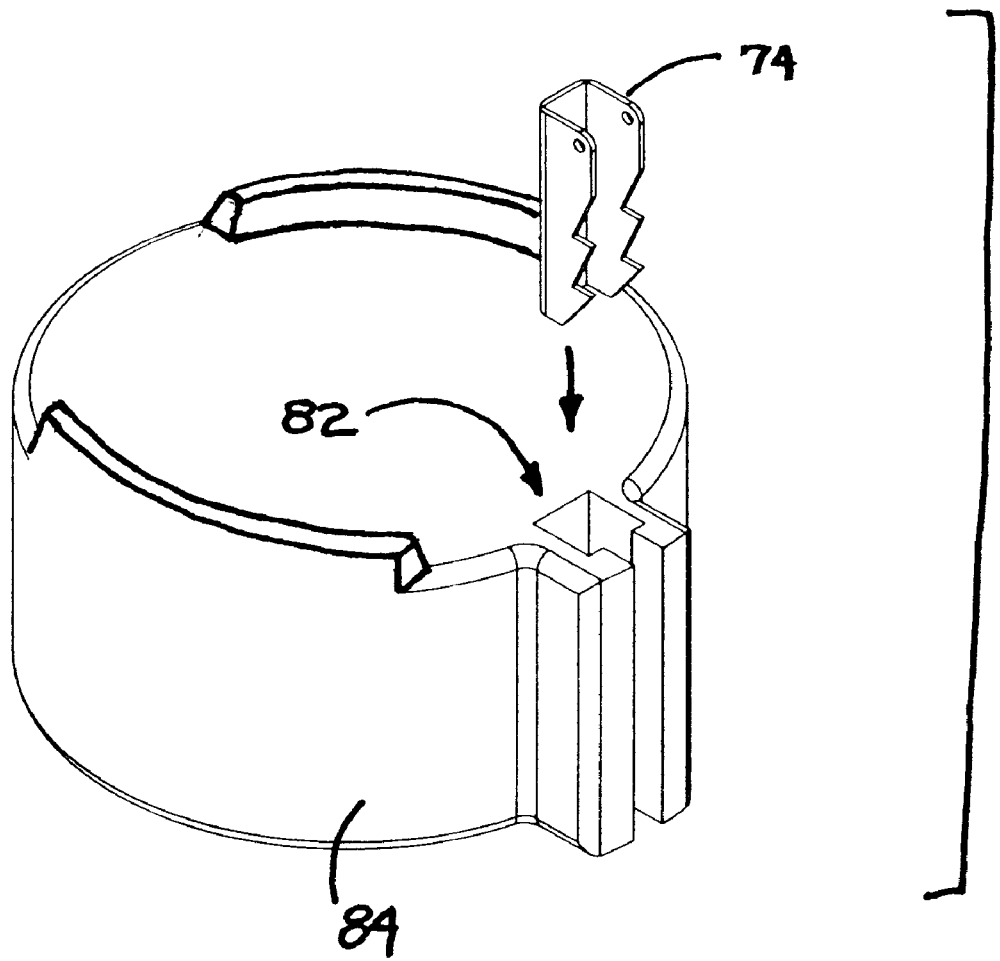
FIG. 7 is an exploded view of a mounting portion of the perch shown in FIG. 6 and a base configured to receive the perch.
Figure 8:
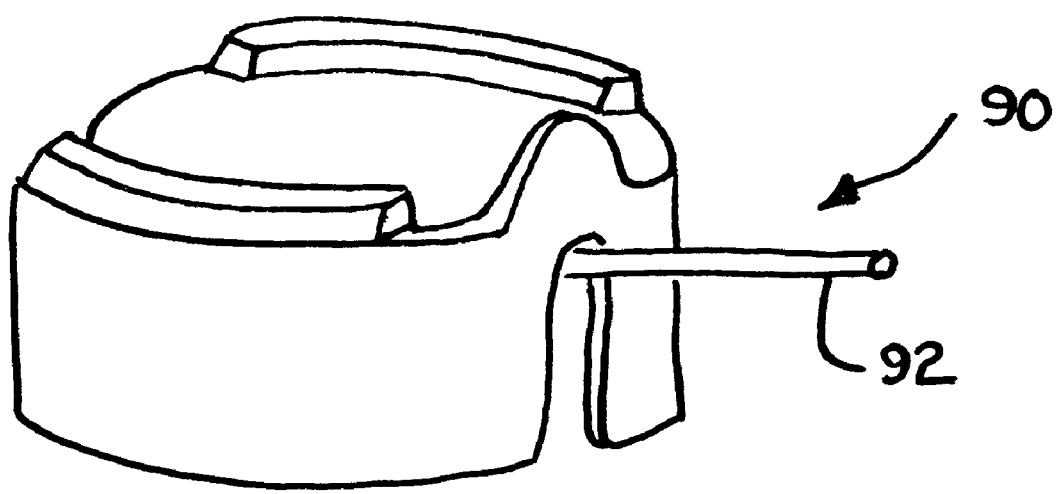
FIG. 8 is a perspective view of another configuration of a perch.
Figure 9:
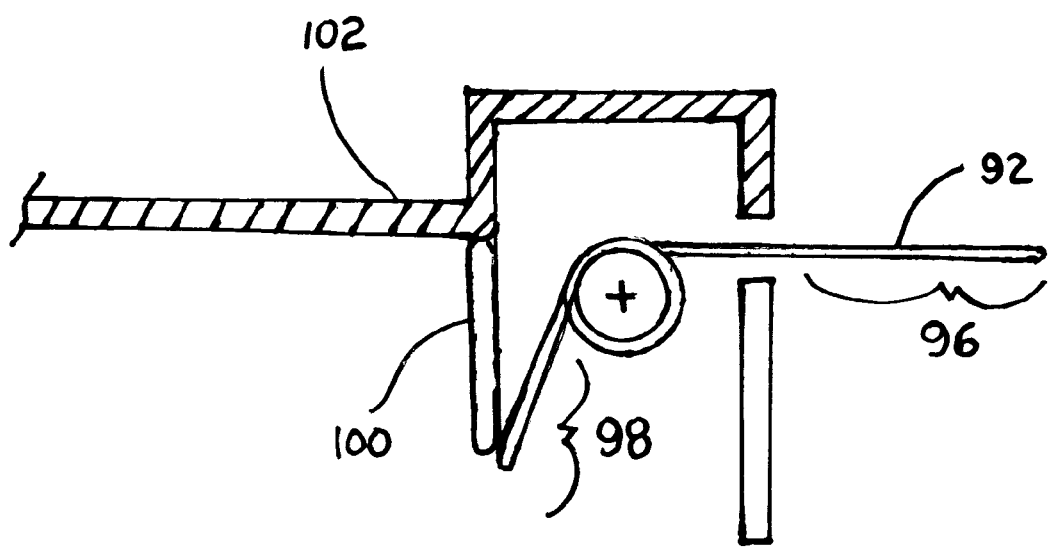
FIG. 9 is a cross-sectional side view of the perch shown in FIG. 8 disposed in a feeder base.

Numerous other configurations are possible for the perch 12. For example, referring to FIG. 5, a perch 60 may have a landing member 62, a mounting member 64, and a spring 66 configured such that a feeding position (as shown) has the landing and mounting members 62, 64 substantially in line, versus near a right angle as with the perch 12 shown in FIGS. 1–3. The mounting member 64 may be attached to a feeder base, e.g., with one or more screws. Alternatively, referring to FIGS. 6–7, a perch 70 may contain a 15 landing member 72, and a spring 76 similar to the member 22 and spring 26 shown in FIGS. 1–3, but with a mounting member 74 configured with teeth or barbs 78 in a wedge portion 80 to be inserted into a slot 82 in, and frictionally engage, a base 84. The mounting member 74 can be forced into the slot 82 such that the toothed-wedge 80 engages walls of the slot 82, and the teeth 78 inhibit removal of the member 74 from the slot 80. Referring to FIGS. 8–9, a perch 90 may comprise a spring 92 rotatably disposed around a pin 94. The spring 92 contains a primary, landing portion 96 and a secondary portion 98 that is mounted to, or disposed to interfere with, a wall 100 of a base 102 such that the perch 90 can provide upward support for birds landing on the landing portion 96.

Figure 10:
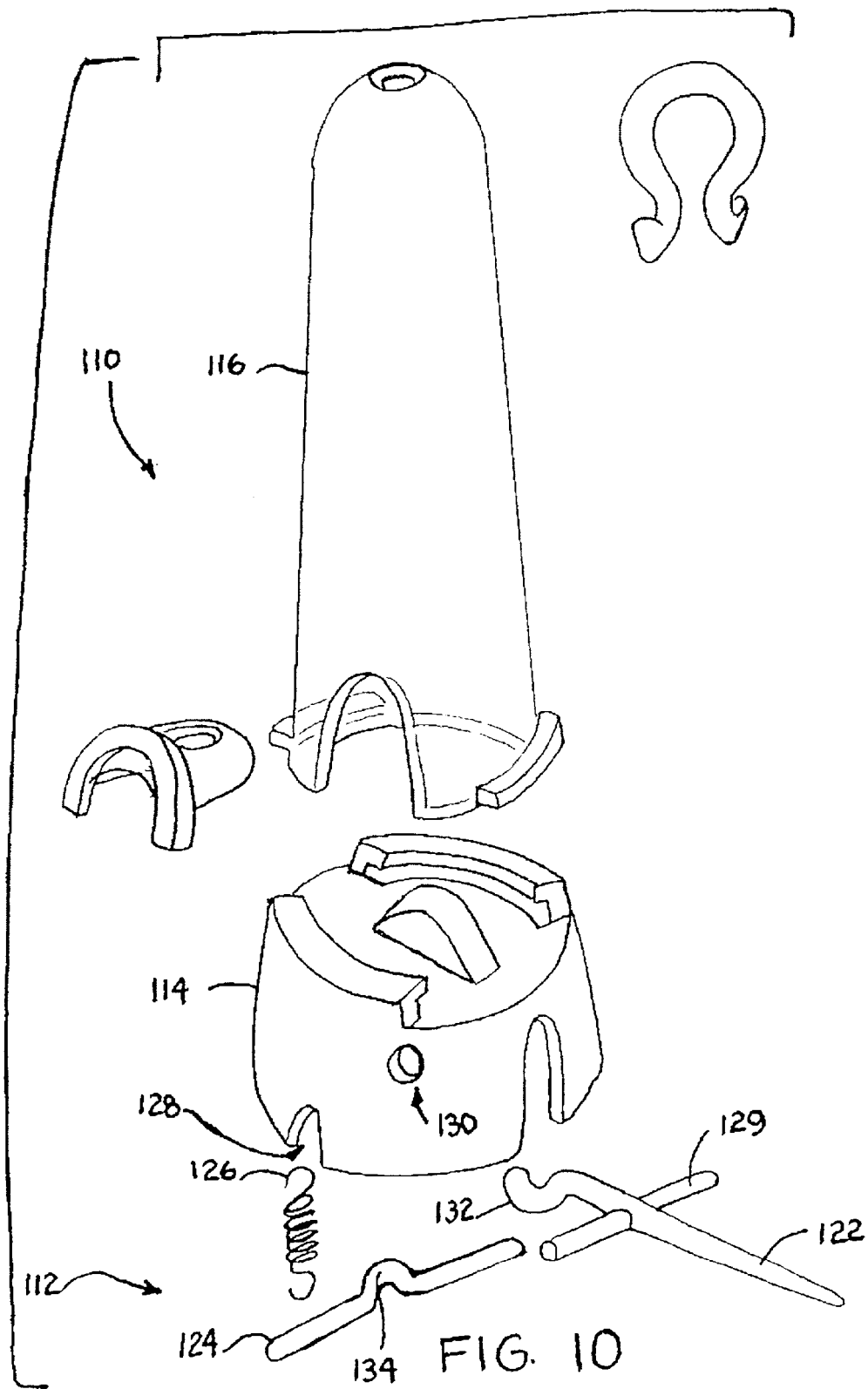
FIG. 10 is an exploded perspective view of another feeder with movable perch.
Figure 11:
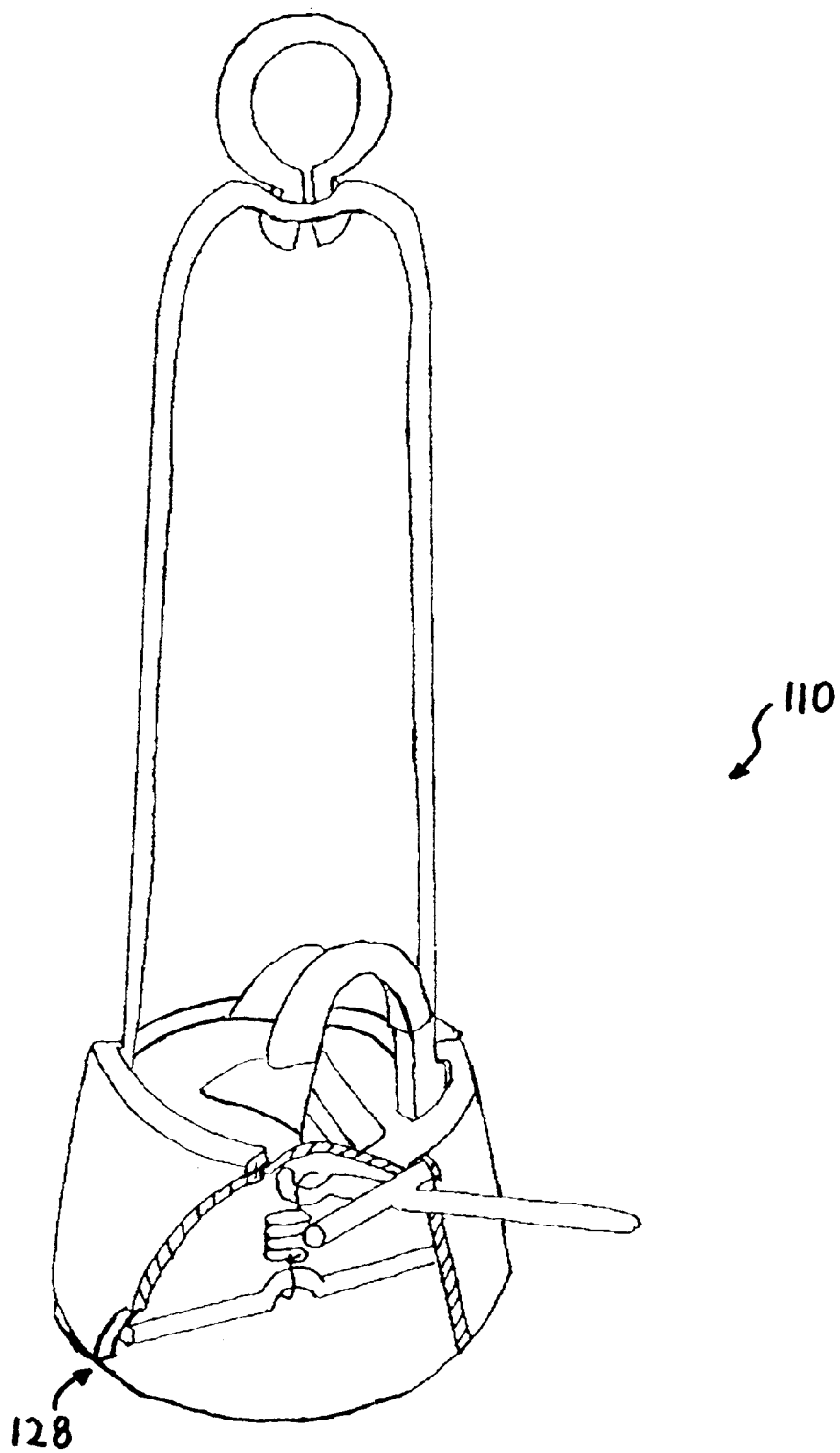
FIG. 11 is an assembled, partially cut-away view of the feeder shown in FIG. 10.

Still further perch configurations are possible. Referring to FIGS. 10–11, a feeder 110 comprises a perch 112, a base 114, and a top 116. The perch 112 includes a landing arm 122, a bias arm 124, and a tension spring 126. The bias arm 124 is disposed in slots 128 (only one shown) and the landing arm has a rod 129 rotatably disposed in holes 130 (only one shown). The spring 126 is coupled to a hook 132 on the landing arm 122 and an arch 134 on the bias arm 124 to bias the landing arm 122 upward into a feeding position as shown in FIG. 11, while allowing the arm 122 to rotate downward toward a release position if a weight equal to or greater than an amount associated with an undesired animal, e.g., an adult squirrel, is applied to the landing arm 122.

Figure 12:
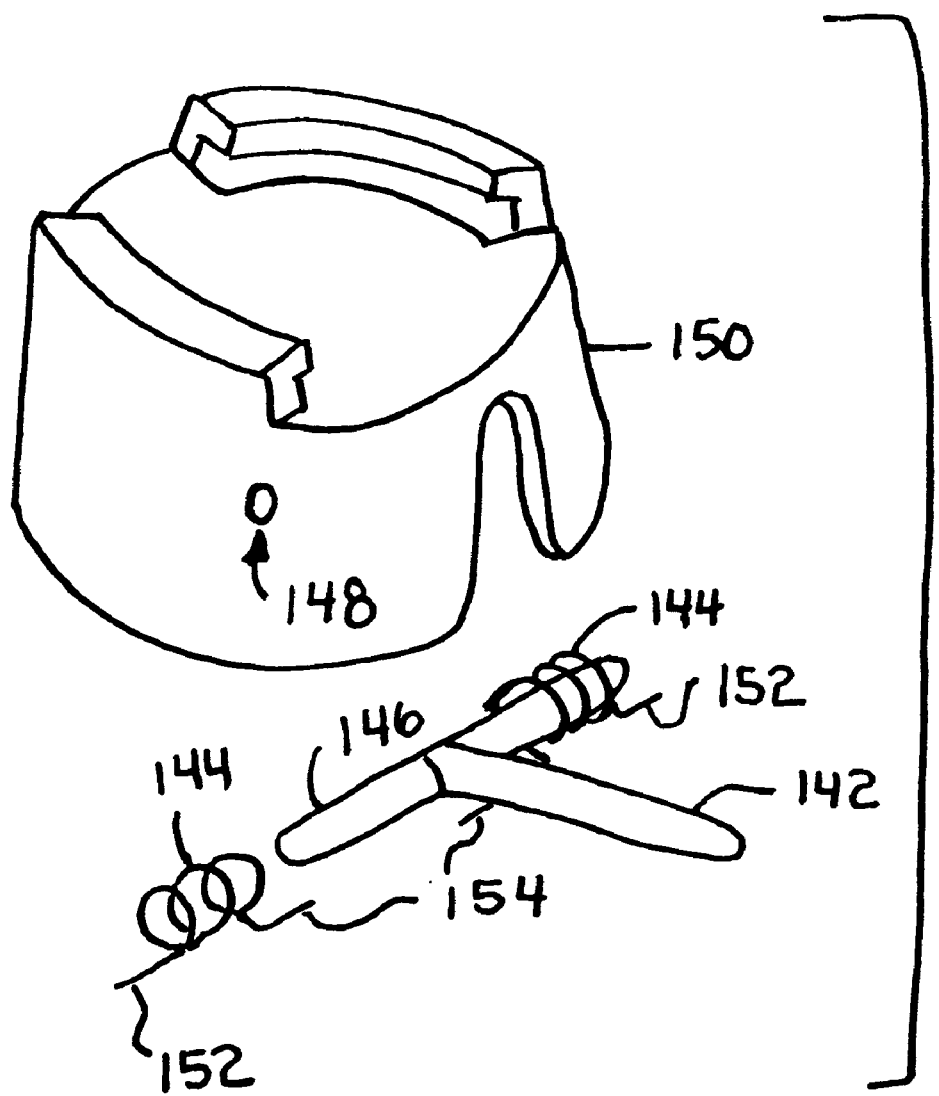
FIG. 12 is an exploded perspective view of another movable perch configuration with a feeder base.

Alternatively, referring to FIG. 12, a perch 140 may comprise a landing arm 142 and two torsion springs 144. The landing arm 142 has a rod 146 configured to be pivotally disposed in holes 148 (only one shown) in a base 150. The springs 144 have base ends 152 attached to the base 150 and landing ends 154 engaged with the landing member 142 to bias the member 142 into a feeding position and to allow rotation of the member 142 downward to a release position if, e.g., an adult squirrel climbs onto the member 142.

Figure 13:
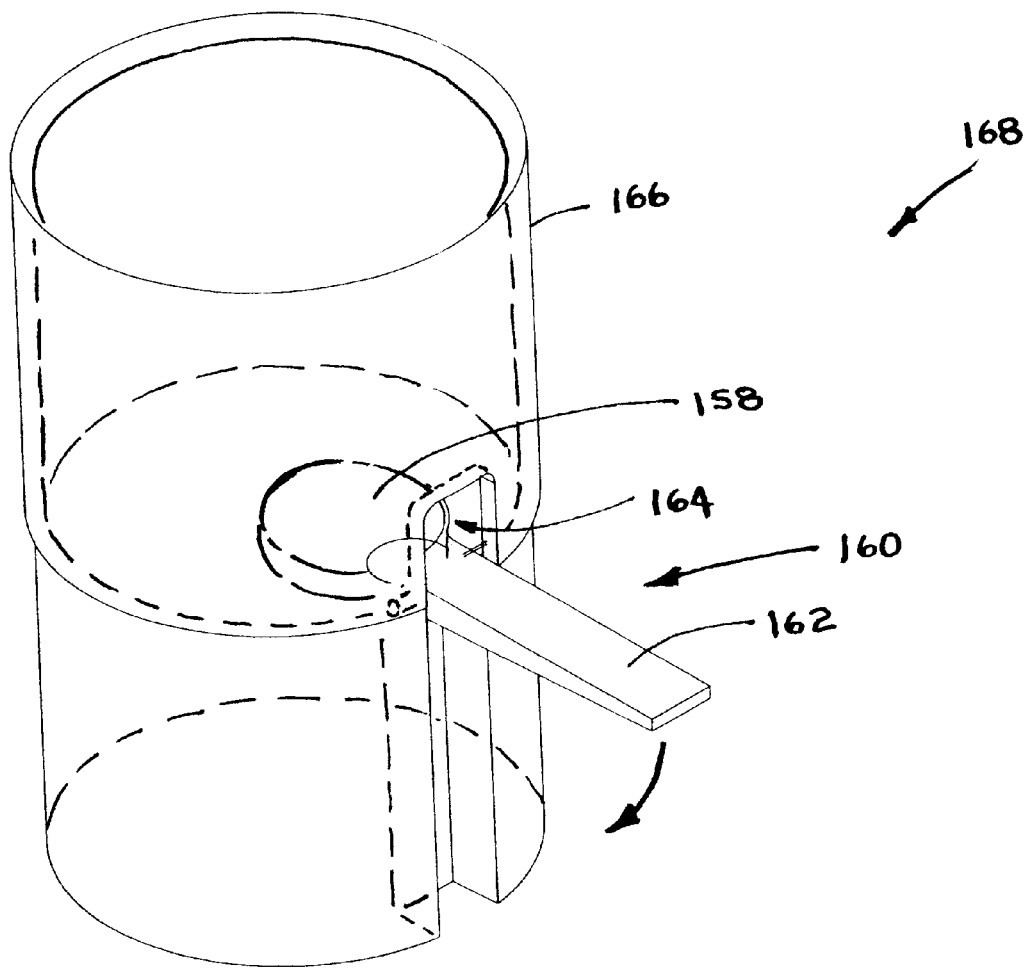
FIG. 13 is a simplified, perspective view of a feeder base, feeder top, and a movable perch with a feed-inhibiting door with the perch in a feeding position.
Figure 14:
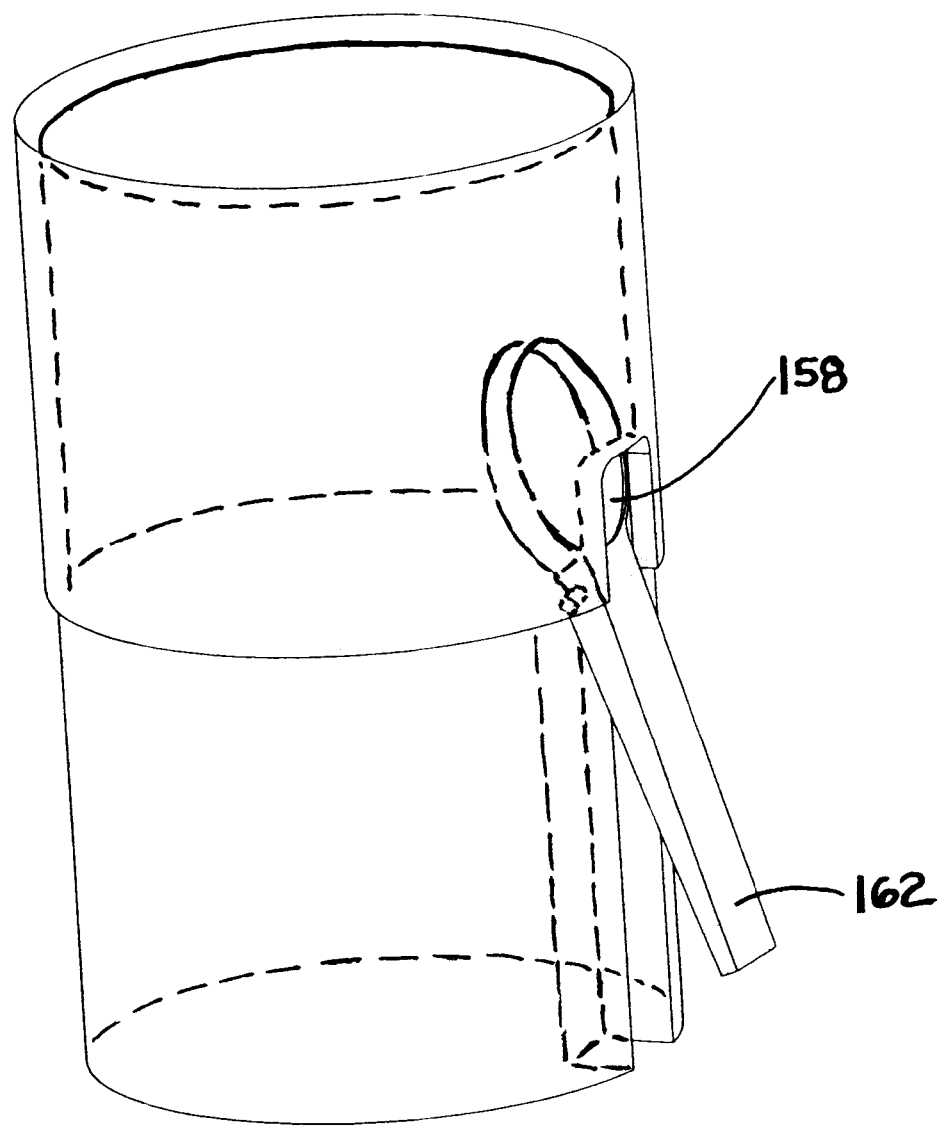
FIG. 14 is a simplified, perspective view of the base, top, and perch shown in FIG. 13 with the perch in a feed-inhibiting position.

Movable perches may also close, block or inhibit access through openings for accessing food in feeders. Referring to FIGS. 13–14, a door 158 may be provided as part of, or connected to, a landing member 162 of a perch 160. The door 158 is configured and connected to be disposed to allow access through an opening 164 in a top 166 of a feeder 168 when the perch is in a feeding position as shown in FIG. 13. The door 158 is further configured and connected to be disposed to inhibit access through the opening 164 when the perch is in a feed-inhibiting position as shown in FIG. 14. As shown, the door 158 blocks or closes the opening 164 as the landing member 162 rotates downward, thus influencing animals on the landing member 162 to slide off and closing the opening 164 to inhibit access to food in the top 166 even if the animal manages to stay on the member 162.

Figure 15:
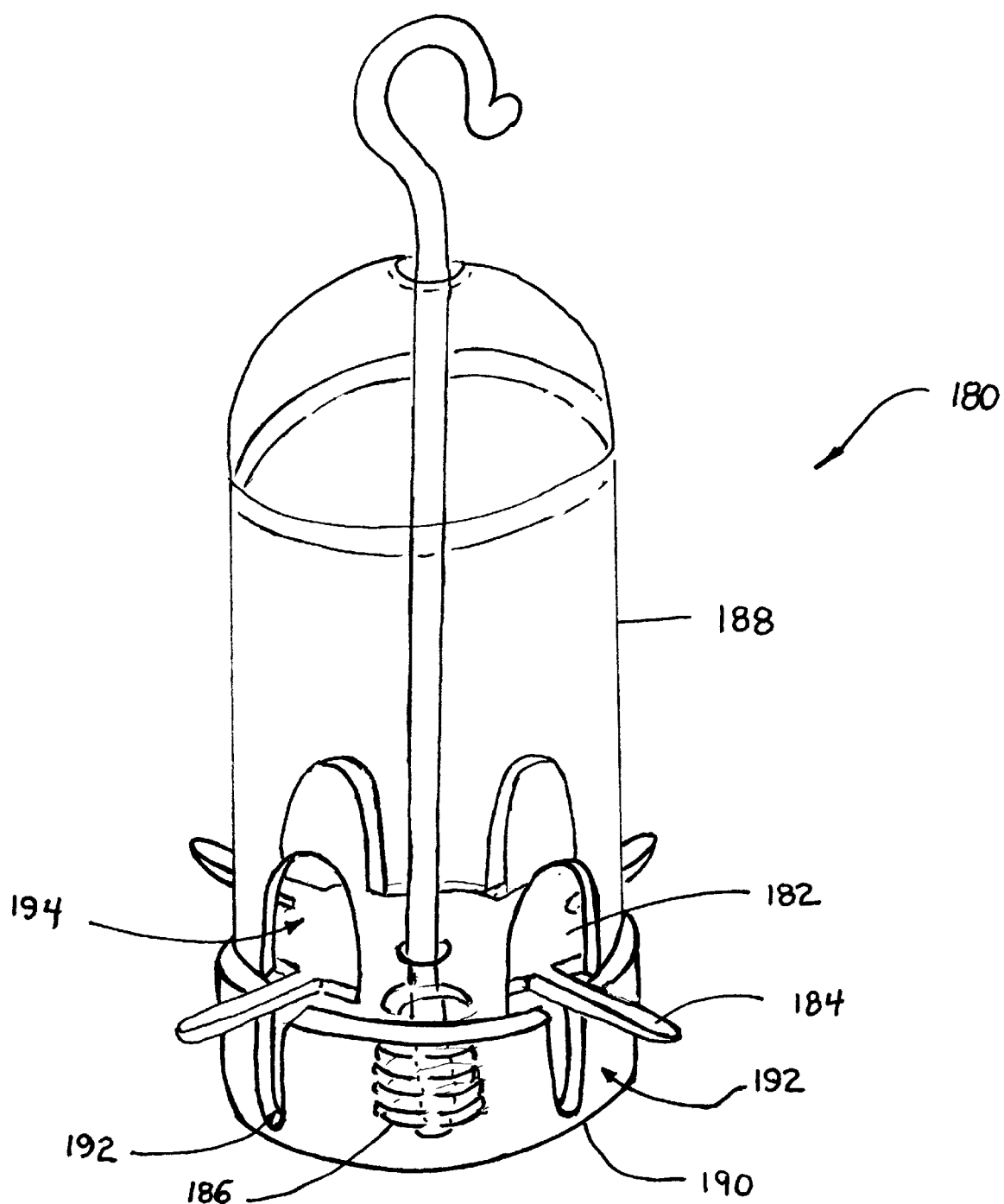
FIG. 15 is a perspective view of another feeder in an open, feeding position.
Figure 16:
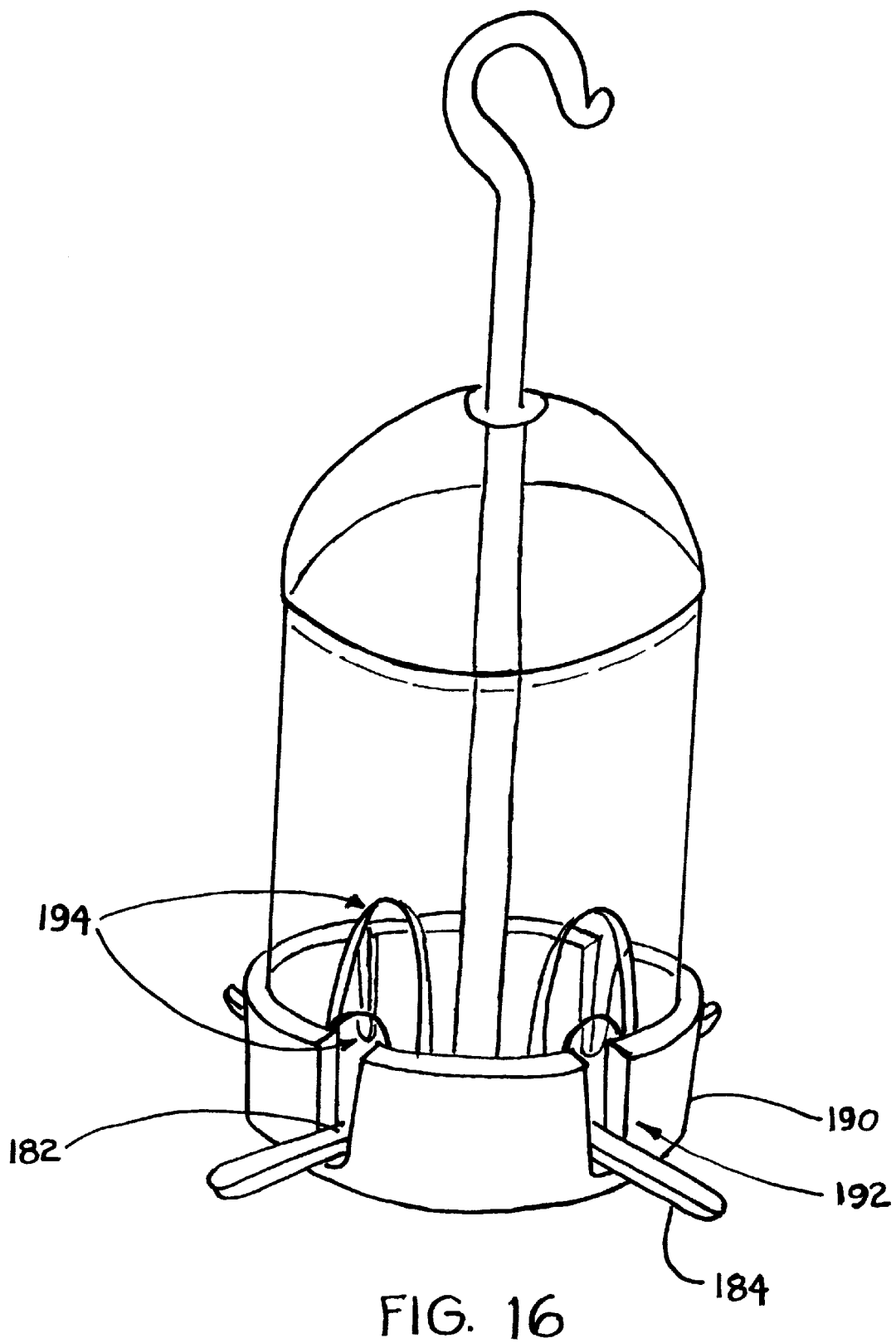
FIG. 16 is a perspective view of the feeder shown in FIG. 15 in a closed, feed-inhibiting position.

Other configurations may be used to close, block or inhibit access through openings for accessing food in feeders. Referring to FIGS. 15–16, a feeder 180 includes a landing platform 182 including four landing member 184, a compression spring 186, a top 188, and a base 190. The base 190 includes slots 192 adapted to receive the landing members 184. The compression spring 186 is configured to compress upon the application of a weight indicative of an adult squirrel, or more weight, to any of the landing members 184. The top 188 is configured to slide within the base 190 as the spring 186 compresses. The top 188 provides openings 194 with heights approximately the same as depths of the slots 192. Further, the base 190 is connected to a hook for hanging the feeder 180 and the landing platform 182 is connected to the top 188. Thus, the feeder 180 is configured such that as the compression spring 186 compresses, the landing platform 182 moves from a feeding position shown in FIG. 15, to a feeding inhibiting position shown in FIG. 16, with the openings 194 being reduced by the base 190 to essentially the slots 192. Preferably, the slots 192 are configured to inhibit access by to an interior of the base 190 by a squirrel (e.g., by being too narrow).

Figure 17:
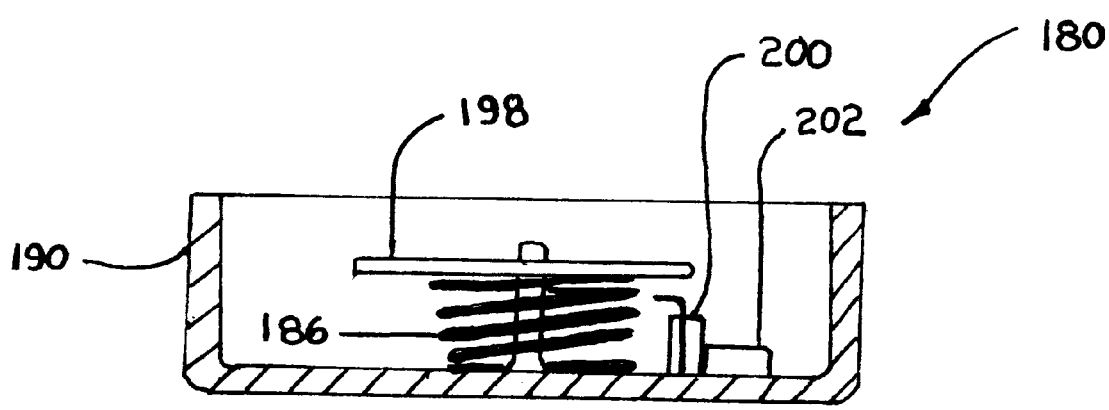
FIG. 17 is a side, cross-sectional view of portions of the feeder shown in FIGS. 15–16.

Further, a sound-producing chip may be provided to help deter undesired animals from using feeders. Referring to FIG. 17, the feeder 180 includes two contacts 198, 200 and a low-power integrated circuit (IC) chip 202. The contacts 198, 200 are disposed and configured to connect and complete a circuit when the compression spring 186 compresses a predetermined amount (e.g., indicative of an undesired animal being on a landing member 184 (see FIG. 15)). The completion of the circuit provides power to the IC chip 202 that is configured to produce sound that is preferably annoying or otherwise deterring to undesired animals. Contacts and sound producing-chips may be provided in configurations of feeders other than the feeder 180 shown in FIG. 17. For example, contacts may be provided in the perch 12 shown in FIGS. 1–3, with the contacts being disposed to make electrical contact when the landing member 22 moves from the feeding position 18 to the feed deterrent position 20.

Figure 19:
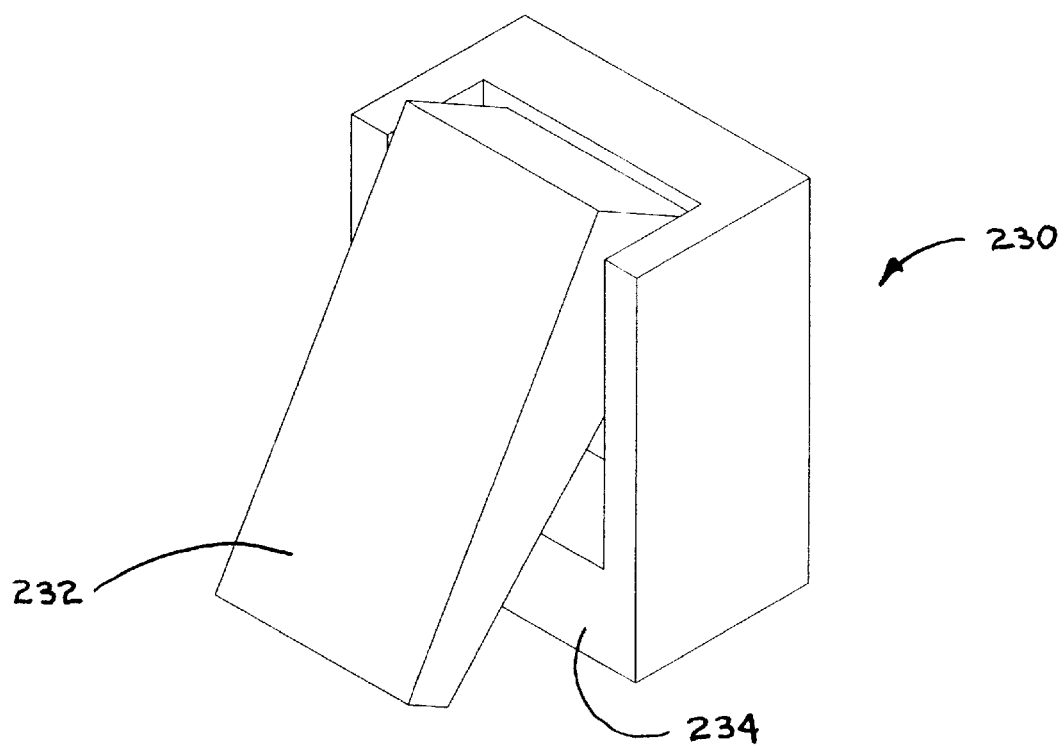
FIG. 19 is a simplified perspective view of an electric movable perch.

Perches may also be configured to be released electrically instead of mechanically. For example, referring to FIG. 19, a landing member 232 of a perch 230 may be held in the feeding position 18 by a stabilizer 234. The stabilizer 234 could replace the mounting member 24 also, and be mounted to the base 14 (FIG. 1). The stabilizer 234 can include a sensor to sense when an object equal to or greater in weight than a typical adult squirrel mounts the landing member 232, and in response thereto, to release the landing member 232 from the feeding position shown in FIG. 19 toward a release position. The stabilizer 234 could even force the landing member 232 toward the release position. The stabilizer 234 could hold or support the landing member 232 in the feeding position and let go of or impel the landing member 232 toward the deterrent/inhibiting position. The stabilizer 234 could operate on one or more batteries.

Figure 20:
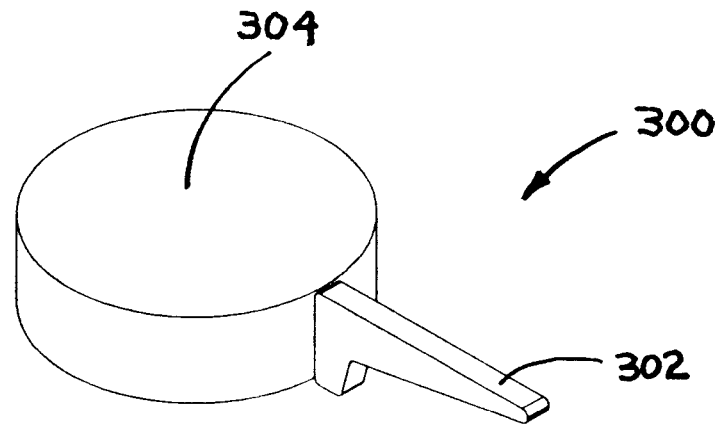
FIG. 20 is a simplified perspective view of a perch with a retractable support portion in a feeding position.
Figure 21:
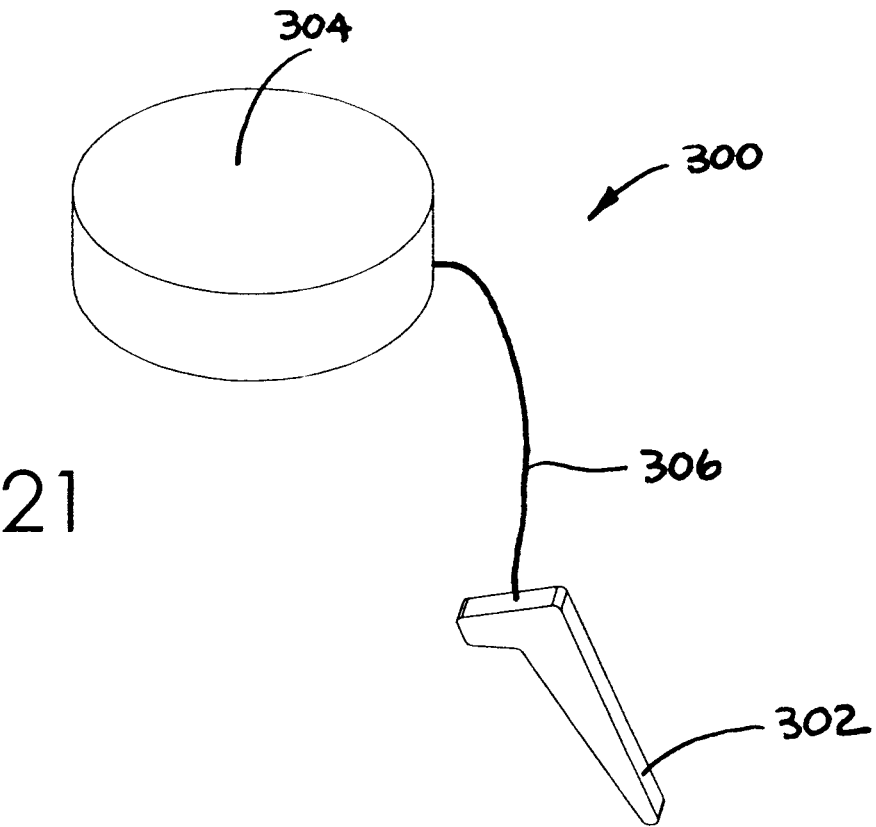
FIG. 21 is a simplified perspective view of the perch shown in FIG. 21 with the retractable support portion in a feed-inhibiting position.

Referring to FIGS. 20–21, a perch 300 includes a landing member 302 and a retractable cord device 304. The device 304 is coupled to the landing member 302 with a a cord 306 being fixedly attached to the landing member 302. The cord is biased to retract to within the device 304, e.g., with a coil spring (not shown), such that the landing member returns to the same, feeding, position each time the cord is extracted and retracted. In operation, the perch 300 is coupled to a bird feeder base such that a bird can land on the landing member 302 and access feed held by the feeder (e.g., in a substantially horizontal (perpendicular to gravity) position). When a squirrel or other animal of equal or greater weight applies its weight to the landing member 302, the member 302 is pulled away from the device as shown in FIG. 21. The member 302 goes from horizontal toward vertical. The squirrel in inclined to fall off of the member 302. Even if the squirrel does not fall off, the cord 306 is preferably long enough such that the cord will extend far enough that a squirrel using the member 302 for support will not be able to access the feed held by the feeder. When the animal's weight is removed from the landing member 302 and cord 306, the cord 306 is retracted and the support member 302 returns to its original position, ready to support a bird for feeding on the contained bird feed.

Still other embodiments are within the scope and spirit of the appended claims. The examples provided above have been provided as non-exhaustive illustrations of the invention claimed.

What is claimed is:

1. A bird feeder configured to hold bird feed and to provide access to the bird feed by birds, the bird feeder comprising:

a housing;

a torsion spring; and a perch pivotally coupled to the housing about a pivot axis and disposed adjacent a perimeter of the housing to have at least a landing portion of the perch move from a feeding position toward a feed-inhibiting position, different from the feeding position, relative to the housing, the perch being configured to have the landing portion provide support for a bird eating the bird feed while the perch is in the feeding position, the perch being further configured and biased by the torsion spring, that is disposed about the pivot axis and coupled to the housing and the perch, to be in the feeding position in the absence of an animal's weight being applied to the landing portion of the perch, and to have at least the landing portion move toward the feed-inhibiting position in response to application to the landing portion of at least an undesired weight;

wherein the perch is configured such that landing portion of the perch will inhibit an undesired animal from using the landing portion for support while in the feed-inhibiting position.

2. The feeder of claim 1 wherein the landing portion is substantially perpendicular to gravity in the feeding position and is substantially parallel with gravity in the feed-inhibiting position.

3. The feeder of claim 1 wherein the landing portion is less than about 45° relative to parallel to gravity in the feed-inhibiting position.

4. The feeder of claim 1 wherein the perch is configured such that the feed-inhibiting position of the landing portion of the perch will influence an undesired animal to fall off of the feeder.

5. The feeder of claim 1 wherein the housing provides an opening configured to allow a bird to access the bird feed held by the feeder and wherein the perch is further configured to inhibit access through the opening when in the feed-inhibiting position.

6. The feeder of claim 5 wherein the perch comprises a door, coupled to the landing portion, that is configured to at least partially block the opening when the landing portion is in the feed-inhibiting position.

7. The feeder of claim 1 wherein the perch is a first perch and the landing portion is a first landing portion, the feeding position is a first feeding position, and the feed-inhibiting position is a first feed-inhibiting position, the feeder further comprising at least a second perch coupled to the housing and configured to have at least a second landing portion move between a second feeding position and a second feed-inhibiting position relative to the housing.

8. The feeder of claim 7 wherein the second perch is configured such that the second landing portion can move between the second feeding position and the second feed-inhibiting position independently of the first landing portion moving between the first feeding position and the first feed-inhibiting position.

9. The feeder of claim 1 further comprising a sound-producing device coupled to at least one of the housing and the perch and configured to be actuated in response to the landing portion moving toward the feed-inhibiting position.

10. A bird feeder configured to hold bird feed and to provide access to the bird feed by birds, the bird feeder comprising:
   a housing; and
   a perch coupled to the housing and configured to have at least a landing portion of the perch move from a feeding position toward a feed-inhibiting position, different from the feeding position, relative to the housing, the perch being configured to have the landing portion provide support for a bird eating the bird feed while the perch is in the feeding position, the perch being further configured to be in the feeding position in the absence of an animal's weight being applied to the landing portion of the perch, and to have at least the landing portion move toward the feed-inhibiting position in response to application to the landing portion of at least an undesired weight;
   wherein the perch is configured such that landing portion of the perch will inhibit an undesired animal from using the landing portion for support while in the feed-inhibiting position; and
   wherein the perch comprises a mounting member adapted to fixedly couple to the housing, a spring, and a landing member having the landing portion and being pivotally coupled to the mounting member, the spring being disposed to bias the landing member away from the mounting member toward the feeding position.

11. The feeder of claim 10 wherein the mounting member is configured with teeth and is configured to be wedged into a receptacle provided by the housing.

12. A bird feeder configured to hold bird feed and to provide access to the bird feed by birds, the bird feeder comprising:
   a housing;
   a perch coupled to the housing and configured to have at least a landing portion of the perch move from a feeding position toward a feed-inhibiting position, different from the feeding position, relative to the housing, the perch being configured to have the landing portion provide support for a bird eating the bird feed while the perch is in the feeding position, the perch being further configured to be in the feeding position in the absence of an animal's weight being applied to the landing portion of the perch, and to have at least the landing portion move toward the feed-inhibiting position in response to application to the landing portion of at least an undesired weight;
   a top;
   wherein the perch is slidably coupled to the housing and is fixedly coupled to a top, the top providing an opening through which birds can access the bird feed, the top being configured such that the opening substantially closes to inhibit access to the bird feed when the perch moves to the feed-inhibiting position; and
   wherein the top defines a plurality of openings, wherein the perch comprises a platform coupled to a corresponding plurality of landing members and the housing defines a corresponding plurality of slots configured to receive the landing members as the landing members move from respective feeding positions toward respective feed-inhibiting positions, and wherein the housing and the top move relative to each other to substantially close the plurality of openings when the landing members move from respective feeding positions toward respective feed-inhibiting positions.

13. A bird feeder for providing access to bird feed by birds and inhibiting access to the bird feed by undesired animals, the bird feeder comprising:
   a housing including a base portion and a top portion, the housing being configured to contain bird seed and provide access by birds to the bird seed, the housing providing a recess; and
   perch means, coupled to the housing, for providing support to a bird to access the bird seed and for moving at least a support portion between a feeding position and a feed-inhibiting position in response to application of an undesired weight to the support portion to at least one of inhibit an undesired animal from using the support portion for support to access the bird feed while in the feed-inhibiting position and inhibit access through the housing to the bird feed, the perch means being configured to have at least a portion of the perch means that is disposed externally to the housing while in the feeding position be received by the recess while in the feed-inhibiting position.

14. The bird feeder of claim 13 wherein the support portion moves from being substantially perpendicular to gravity, with the feeder in use, while in the feeding position toward being parallel to gravity when moving toward the feed-inhibiting position.

15. The bird feeder of claim 13 wherein the support portion of the perch means is spring-biased toward the feeding position.

16. A bird feeder for providing access to bird feed by birds and inhibiting access to the bird feed by undesired animals, the bird feeder comprising:

a housing including a base portion and a top portion, the housing being configured to contain bird seed and provide access by birds to the bird seed; and perch means, coupled to the housing, for providing support to a bird to access the bird seed and for moving at least a support portion between a feeding position and a feed-inhibiting position in response to application of an undesired weight to the support portion to at least one of inhibit an undesired animal from using the support portion for support to access the bird feed while in the feed-inhibiting position and inhibit access through the housing to the bird feed;

wherein the perch means comprises a retractable cord coupled to the support portion.

17. A bird feeder for providing access to bird feed by birds and inhibiting access to the bird feed by undesired animals, the bird feeder comprising:

a housing including a base portion and a top portion, the housing being configured to contain bird seed and provide access by birds to the bird seed; and perch means, coupled to the housing, for providing support to a bird to access the bird seed and for moving at least a support portion between a feeding position and a feed-inhibiting position in response to application of an undesired weight to the support portion to at least one of inhibit an undesired animal from using the support portion for support to access the bird feed while in the feed-inhibiting position and inhibit access through the housing to the bird feed;

wherein the perch means comprises a sensor and an electrical release configured to allow the support portion to move in response to the sensor indicating application of the undesired weight to the support portion.

18. A movable perch replacement for use with a bird feeder including a base, the replacement comprising:

a mounting member configured to be mounted to the base of the bird feeder;

a spring; and a landing member pivotally coupled to the mounting member and biased by the spring away from the mounting member;

wherein the spring is configured to support the landing member, while a bird stands on the landing member, in a substantially horizontal position and to allow the landing member to pivot toward a substantially vertical position in response to an undesired weight being applied to the landing member.

19. The perch replacement of claim 18 wherein the mounting member is sized and shaped to fit into a receptacle of the base.

20. The perch replacement of claim 19 wherein the mounting member includes at least one barb configured to resist removal from the receptacle.

21. A bird feeder configured to hold bird feed and to provide access to the bird feed by birds, the bird feeder comprising:

a housing; and a perch coupled to the housing and configured to have at least a landing portion of the perch move from a feeding position toward a feed-inhibiting position, different from the feeding position, relative to the housing, the perch being configured to have the landing portion provide support for a bird eating the bird feed while the perch is in the feeding position, the perch being further configured to be in the feeding position in the absence of an animal's weight being applied to the landing portion of the perch, and to have at least the landing portion move toward the feed-inhibiting position in response to application to the landing portion of an undesired weight;

wherein the perch is configured such that landing portion of the perch will inhibit an undesired animal from using the landing portion for support while in the feed-inhibiting position; and wherein the landing portion is at least a portion of a spring and provides a substantially solid landing surface.

22. The feeder of claim 21 wherein the landing portion is an elongated portion of a torsion spring extending away from the housing.

23. The feeder of claim 21 wherein the housing provides a recess and the landing portion is configured and coupled to the housing such that at least a portion of the landing portion that is disposed externally to the housing while the perch is in the feeding position is received by the recess while the perch is in the feed-inhibiting position.

24. A bird feeder configured to hold bird feed and to provide access to the bird feed by birds, the bird feeder comprising:

a housing providing a recess; and a perch coupled to the housing and configured to have at least a landing portion of the perch move from a feeding position toward a feed-inhibiting position, different from the feeding position, relative to the housing, the perch being configured to have the landing portion provide support for a bird eating the bird feed while the perch is in the feeding position, the perch being further configured to be in the feeding position in the absence of an animal's weight being applied to the landing portion of the perch, and to have at least the landing portion move toward the feed-inhibiting position in response to application to the landing portion of an undesired weight;

wherein the perch is configured such that landing portion of the perch will inhibit an undesired animal from using the landing portion for support while in the feed-inhibiting position; and wherein the perch is configured and coupled to the housing such that at least a portion of the landing portion that is disposed externally to the housing while the perch is in the feeding position is received by the recess while the perch is in the feed-inhibiting position.

25. The feeder of claim 24 further comprising a spring coupled to the housing and the perch to bias the landing portion away from the recess provided by the housing.

26. The feeder of claim 24 wherein the housing Provides a slot substantially parallel to gravity, while the feeder is in use, as the recess.

* * * * *